Oct. 14, 1924.
J. W. DIRKSON ET AL
1,511,662
WORK CONVEYING PLATFORM OR CAR
Filed Jan. 22, 1921    5 Sheets-Sheet 2
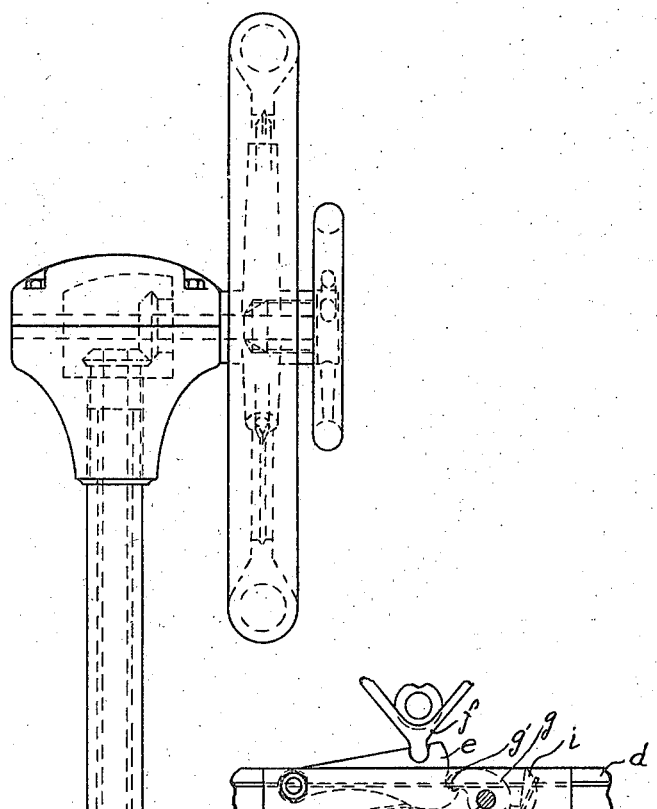
FIG. 2
FIG. 6
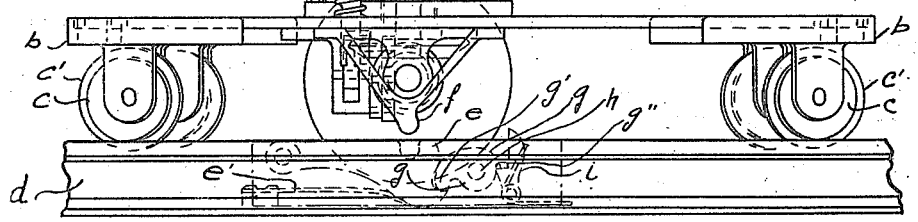
John W. Dirkson, Lee E. Clough, Inventors,
Attorney.

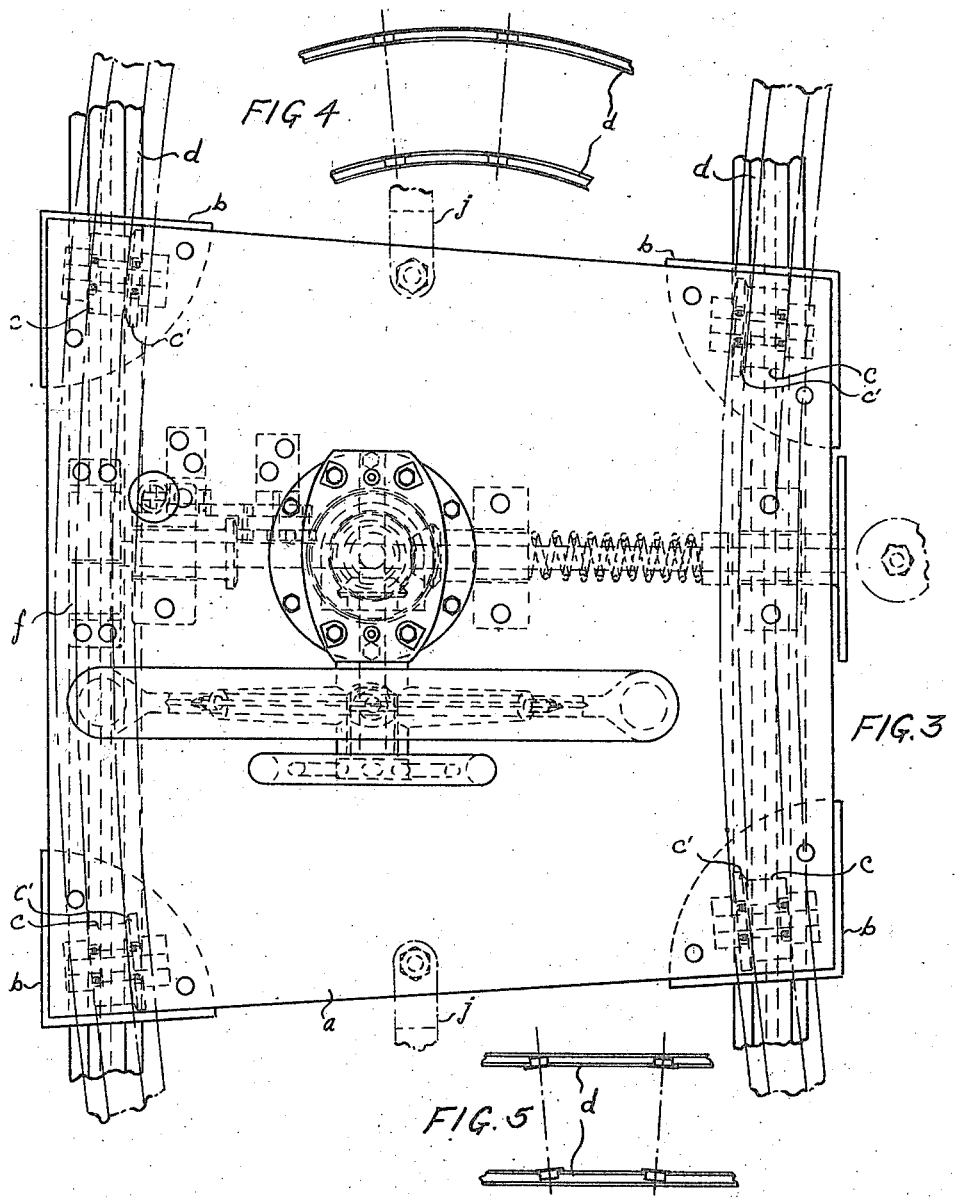

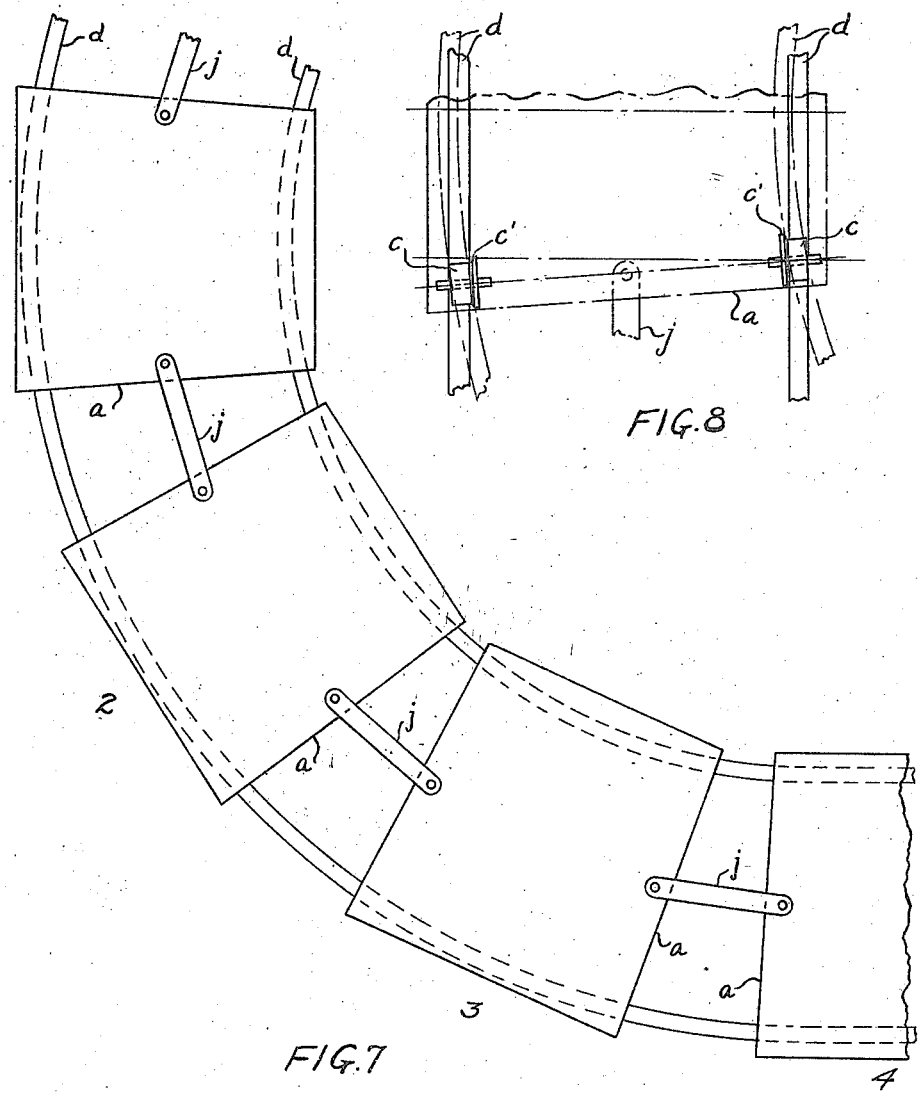

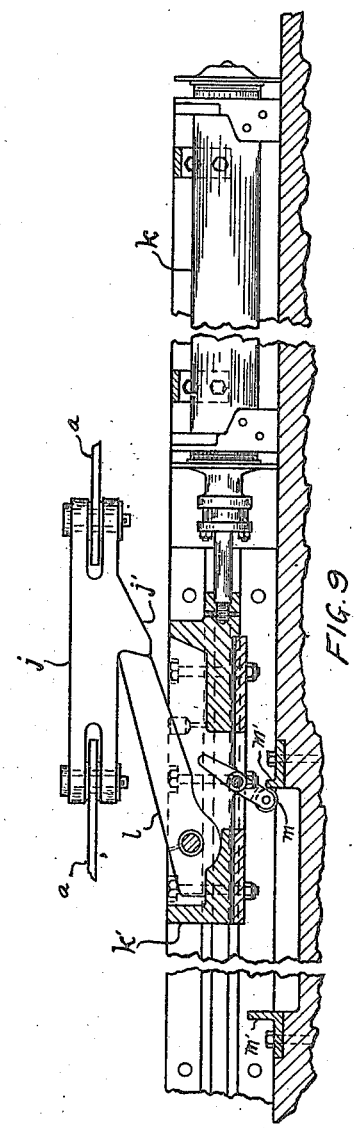

Patented Oct. 14, 1924.

1,511,662

UNITED STATES PATENT OFFICE.

JOHN W. DIRKSON, OF KENT, AND LEE E. CLOUGH, OF AKRON, OHIO.

WORK-CONVEYING PLATFORM OR CAR.

Application filed January 22, 1921. Serial No. 439,287.

*To all whom it may concern:*

Be it known that we, JOHN W. DIRKSON and LEE E. CLOUGH, citizens of the United States, and residents, respectively, of Kent, in the county of Portage and State of Ohio, and of Akron, in the county of Summit and State of Ohio, have invented new and useful Improvements in Work-Conveying Platforms or Cars, of which the following is a specification.

Our invention relates to improvements in work conveying platform or car, and has for its object the provision of a car or portable structure with actuating means adapted for conveying factory products from one station to another whereon successive constructive operations are performed at such different stations. Preferably, in factory practice, these cars are mounted upon circular, and more often straightsided and substantially elliptical, tracks, in order to conserve space and obtain continous operation of the system; the cars being connected in a complete circuit of the track whereon they are advanced step by step as the work progresses.

Our invention, as herein specifically applied and described, is adapted for building carcasses of pneumatic tires, although it will be understood that the improvements herein described and claimed are not necessarily limited to this employment or use. The procedure in thus building the carcasses requires that each stage of the work shall be efficiently performed within a minimum time limit; hence it is essential to commercial production that the product, to wit: the carcasses mounted upon suitable tire bucks, shall be advanced from station to station, securely held in position for the work to be performed and as promptly released for advance to the next succeeding station. Accordingly, we have devised certain improvements, as set out more definitely in the claims and explained at length in the specification, each marking a distinct advance in the art.

These improvements, as modified and applied to the tire building art, may best be explained in connection with the accompanying drawings, wherein:

Figure 2 is a view thereof in front elevation.

Figure 3 is a plan view of said device,

Figures 4 and 5 are merely diagrammatical views which indicate the positioning and operation of the car wheels.

Figure 6 is a fragmentary view showing one of the track detents.

Figure 7 is another diagrammatical view illustrating a portion of the curved and straight track section with the cars at stations 1, 2, 3, etc.

Figure 8 is an enlarged view of two opposing flanged wheels in their approximate tangential relation with the rails, and Figure 9 is an enlarged fragmentary view, partially broken away, showing the actuating mechanism for advancing the cars.

Throughout the several figures of the drawings we have employed the same character of reference to indicate similar parts.

Figure 1:
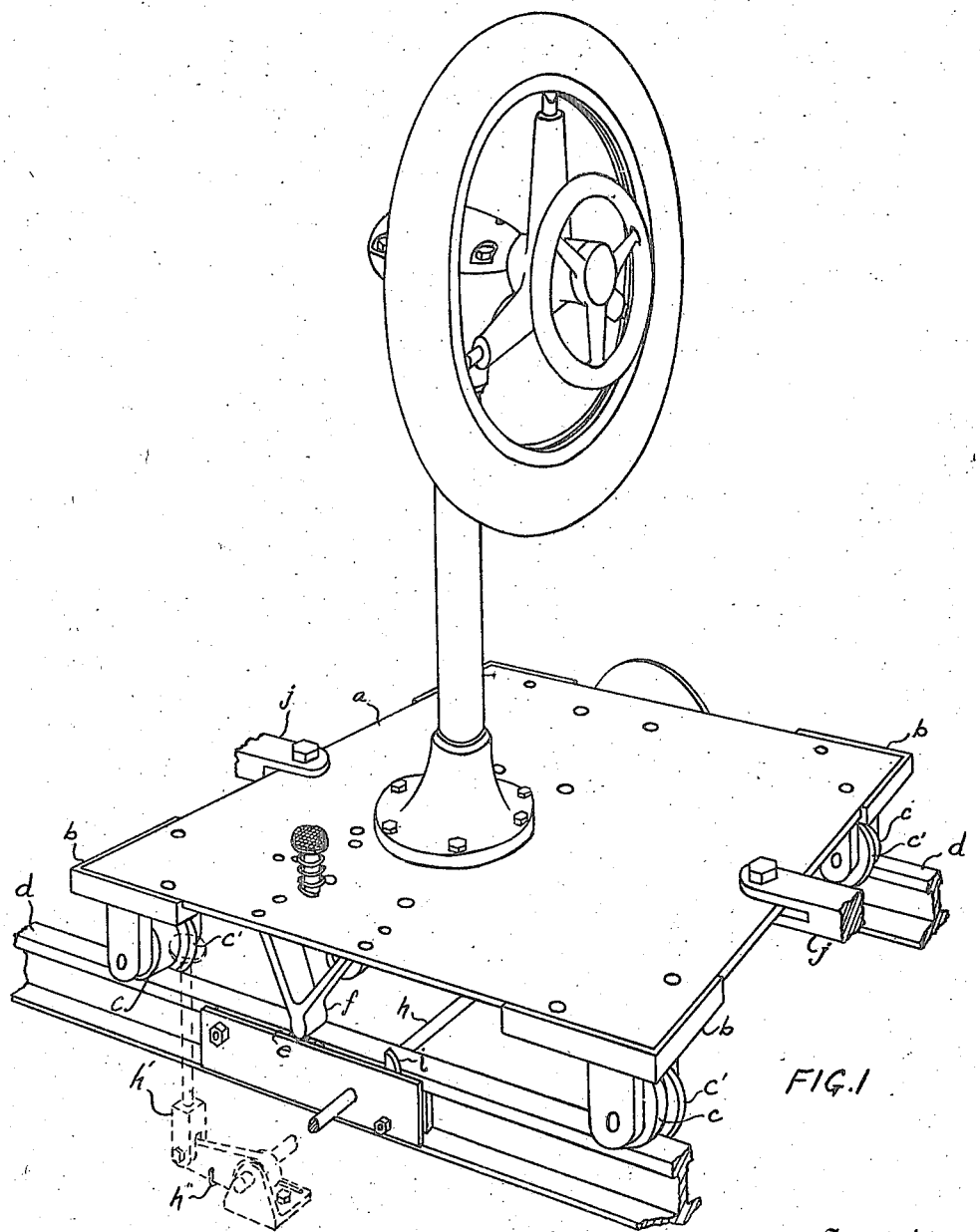
Figure 1 is a perspective view of one of the cars and the tire buck mounted thereon.

The bed ($a$) of the car or truck comprises a four sided iron plate, somewhat wider at the front than at the back, as best shown in Figure 3, in order that the curvature of the track may be more readily accommodated and the cars may be closely connected. At the four corners of the bed ($a$) flanged corner brackets ($b$) are riveted to the underside of said bed wherein there are journaled the supporting wheels ($c$). Preferably, these wheels are small in diameter and are provided with short curved flanges ($c'$) for engaging the inner faces of the supporting rail heads.

In ordinary practice it is customary to widen the gauge of a track at the curved portions thereof and to bank the outer rail, but this we have avoided in order to prevent any side-play of the car throughout the entire circuit of the track, which is endless, and usually is provided with straight side sections and rather sharply curved end sections, as respectively shown in Figures 5 and 4 by diagram and in Figure 3 by the full and dotted lines showing the rails ($d$), both straight and curved sections being of uniform gauge.

Departing again from ordinary practice, the opposing wheels ($c$) are set upon the bed approximating but slightly less than the radial angle of the curved sections of track: the inner wheels ($c$) thereby being positioned closer together than are the outer wheels, as shown in accurate relation in Figure 3 and somewhat exaggerated form for the purpose of illustrating the theory in Figures 4 and 5. In order better to fit all sections of track, these stationary wheels are spaced apart at a slightly greater gauge as compared with the uniform gauge of track, so that the curved flanges of the wheels will hug the inner surfaces of the rail heads which preferably are greased. Thus the cars are afforded a stable base at all of the operative stations along the track.

At each of the stations there are provided duplicated locking means, such as shown in Figure 6, whereby each car may be held securely in position, or in alignment, until the work has been completed at each of the several stations. The recessed latch (e) thereof is provided with a spring (e'), tending normally to force the latch to its full line position, Figure 6, wherein it engages a stop (f) carried by the car and securely hold said car against either forward or backward movement along the rails. The rotatable cams (g), connected by the rod (h), Figure 1, are associated with both the front and rear rails and the corresponding latches (e). Accordingly, an operative upon depressing the plunger (h') against the tension of the spring (h''), as shown in dotted lines, Figure 1, is enabled to retract both the front and rear latches (e) upon rotating the contacting ends (g') of said cams within the recessed ends of their respective latches (e). A complete depression of the plunger (h') rotates said cams sufficiently to permit the dog (i) to engage the shoulder (g'') of the cams, whereby the associated latches (e) are locked in their retracted positions and the brackets (f) are disengaged, as shown in Figure 2. It is not absolutely essential that the cars shall be locked front and rear by duplicated brackets and latches, as just indicated above, but this construction is preferable since it lends material stability to the working position of each car.

When the car is advanced toward the right, the bracket (f) serves to trip the dog (i), thereby effecting the release of the cams (g) and the associated latches (e) from their retracted positions.

The several cars are connected by short swiveled links (j), each having the depending lug (j') (Fig. 9), whereby the connecting train circuit of cars may be advanced from station to station. For this purpose we preferably employ one or more bracketed air cylinders (k), such as shown in Figure 9. Each cylinder is of such length as to afford a stroke equal to the travel of a car from station to station, and, in addition, provides a terminal cushioning space for the air at both ends of the stroke. This, accordingly, affords a safe and efficient means for impelling the train without shock or jar, although we do not limit our improvements to the means in question. The details thereof comprise a crosshead (k'), having a stout pivoted latch (l) mounted at the extremity thereof. Normally this latch is retracted by its own weight, but beneath said latch there is positioned a pivoted arm (m) which is adapted to elevate the latch immediately its lower end is engaged with the shoulder (m') upon the outward movement of the crosshead while said arm is retracted at the completion of the stroke upon its engagement with the shoulder (m'). Thus the latch is first upwardly extended to engage the lug (j') and advances the train under the impetus of the air cylinder and then is self retracting upon the outer stroke of the air cylinder for advancing the train, step by step.

As above explained, the cars will be automatically stopped and held by the locking mechanism of Figure 6 upon each successive forward movement of the train, and the workman is enabled to complete his allotted task in tire building before he releases his particular car, and the next one is advanced in the manner just described. The precise character of the work need not be indicated since our present invention is concerned merely with the means for bringing the work to and from the different operative positions of the system.

Having now described the apparatus embodying our invention and defined its application to one of the arts, we claim as new and desire to secure by Letters Patent, together with such modifications and adaptations as may be made merely by those skilled in the art, the following:

1. In combination with an endless curved railway, a plurality of work conveying platforms mounted thereon; each platform comprising a four-sided bed plate wider at its outer than its inner edge and four flanged supporting wheels mounted in rigid bearings upon the underside of the bed with their axes approximating the radial angle of the curved section of railway, substantially as set forth.

2. In combination with an endless curved and straightsided railway, a plurality of work conveying platforms mounted thereon; each platform comprising a four-sided bed plate wider at its outer than its inner edge and four flanged supporting wheels mounted in rigid bearings upon the underside of the bed with their axes approximating less than the radial angle of the curved section of railway, substantially as set forth.

3. In combination with an endless curved and straightsided railway, a plurality of work conveying platforms mounted thereon; each platform comprising a bed positioned closely adjacent to the rails of said railway, and mounted thereon by two sets of wheels within rigid bearings, having their axes at less than but approximately that of the radial angle of the curved section of railway, and means for temporarily locking the platforms in predetermined positions along the railway, substantially as set forth.

4. In combination with a work supporting railway having relatively curved and straight portions; the curved portions being of the same gauge as the straight portions with an unbanked outer rail, of a plurality of work supporting cars mounted for travel upon said railway, and means independently operable at various predetermined positions for temporarily locking the cars and jointly releasing the same, substantially as set forth.

5. In combination with a work conveying car, of supporting rails whereon the car is adapted to travel, means associated with each rail at predetermined positions for locking the car against travel and independently actuated means at each position for releasing the car, substantially as set forth.

6. In combination with supporting rails and a wheeled work conveying platform mounted thereon, of a power device positioned between said rails having a reciprocatory movement longitudinally thereof, an over-balanced latch member actuated thereby, a co-acting arm pivoted beneath the latch member to elevate the same, and stops between which the arm travels for extending and retracting such arm, whereby the latch may be operably engaged to effect the travel of the platform, substantially as set forth.

7. In combination with an endless railway and a plurality of cars mounted thereon, of means for locking said cars in predetermined positions along the railway, a fluid actuated cylinder positioned adjacent to and substantially in the plane of said rails, and connecting means for effecting the intermittent travel of the cars, step by step, substantially as set forth.

8. A work conveying platform comprising a four-sided, substantial flat bed plate, wider at its outer than its inner edge, four corner brackets secured adjacent to the corners of said bed plate, and two pairs of opposing wheels mounted by said brackets rigidly with respect to the bed plate with their axes forming an acute angle, substantially as set forth.

9. In combination with a supporting rail and a wheeled platform traveling thereon, of a detent carried by the platform, a pivoted recessed latch mounted rigidly with respect to the rail; the recess being adapted to engage and hold the detent, a retracting cam for the latch and a dog adapted temporarily to maintain the latch in its retracted position, substantially as set forth.

10. In combination with an endless track comprising curved and straight side-sections of uniform gauge, of a carrier mounted thereon equipped with four flanged wheels; the extended axes of said wheels forming an acute angle and the effective gauge being less than, but approximating closely that of the track, substantially as set forth.

11. A car or carrier of the class described, comprising a rigid metal bed-plate, corner brackets secured thereto, and four flanged wheels journaled to rotate in said brackets with their extended axes permanently forming an acute angle, whereby the carrier is maintained in definite position intermediately of its supporting rails, substantially as set forth.

12. In combination with an endless track comprising curved and straight sections, of a carrier mounted to travel upon said track comprising a rigid metal bed-plate wider at its outer edge, and four flanged wheels rigidly journaled at its corners with their extended axes permanently forming an acute angle, whereby said carrier is maintained in definite position intermediately of the straight and curved sections of track, substantially as set forth.

In testimony that we claim the foregoing as our invention, we have hereto set our names this 22nd day of December, A. D. 1920.

JOHN W. DIRKSON.
LEE E. CLOUGH.